United States Patent Office 2,880,203
Patented Mar. 31, 1959

2,880,203

PROCESS FOR THE PREPARATION OF PENICILLIN DERIVATIVES

Alexander Bertus Arnold Jansen, Kew, and John Christopher Hamlet, Pinner, England, assignors, by mesne assignments, to Lovens Kemiske Fabrik ved A. Kongsted, Copenhagen, Denmark, a firm No Drawing. Application February 26, 1953
Serial No. 339,158

Claims priority, application Great Britain
February 29, 1952

5 Claims. (Cl. 260—239.1)

This invention is concerned with improvements in or relating to the preparation of esters and amides of penicillin G and penicillin X; as is now well-known penicillin G and penicillin X can be represented by the general formula—

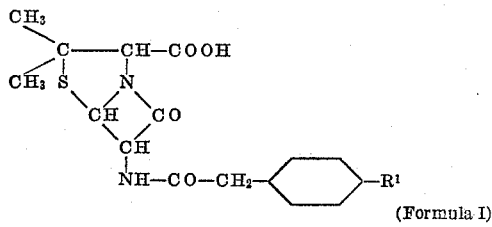

(Formula I)

where $R^1$ is hydrogen in the case of penicillin G or a hydroxyl group in the case of penicillin X. The term "penicillin" as used hereinafter refers to either penicillin G or penicillin X.

It has been recognized that the maintenance of an effective concentration of penicillin in certain parts of the body can be prolonged by administering certain of its derivatives to the patient in question and an example of a suitable derivative for this purpose is the diethyl aminoethyl ester of penicillin; it is believed that it may be possible to obtain a similar effect by converting the penicillin into one or other of its carboxylic acid derivatives.

In research work which we have carried out in this field we have discovered a new and simple method of making penicillin esters and amides which we believe to be generally advantageous and which is of general application. In several instances the yield is better than that obtained by hitherto known methods. Our new method therefore facilitates research into the esters and amides of penicillin and is of particular value in that it is generally applicable, in contrast to hitherto known methods, gives reasonably good yields and is simple to carry out. In addition no reactants are required which would be liable to cause rapid decomposition of the penicillin.

Our new method of preparing penicillin esters and amides is based on the use as intermediates of new compounds of the general formula

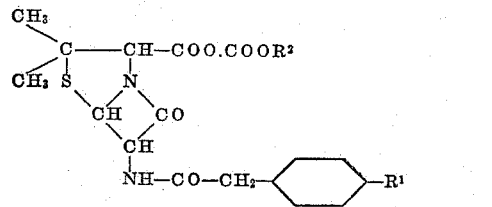

(Formula II)

where $R^1$ has the above-mentioned meaning and $R^2$ is an alkyl, aralkyl, or aryl group. These compounds, which may be readily prepared by the action of a chloroformic ester on a penicillin salt, can be readily converted to a penicillin ester by treatment with a hydroxylic compound under basic conditions or to an amide by treatment with a primary or secondary amine.

Accordingly the invention comprises as new compounds, compounds of the above general Formula II where R has the above-stated meaning.

According to a further feature of the invention we provide a process for the preparation of compounds of the general Formula II in which a penicillin salt is reacted in an inert solvent with a chloroformic ester.

According to yet another feature of the invention we provide a process for the production of esters and amides of penicillin in which compounds of the general Formula II are reacted in an inert solvent with a hydroxylic compound under basic conditions as hereinafter defined or with a primary or secondary amine.

We prefer to utilise such compounds of the general Formula II in which $R^2$ is an alkyl group having not more than four carbon atoms, for example a methyl, ethyl, propyl or butyl group, or a benzyl group, and the invention specifically includes these compounds, their preparation as herein described and their conversion to esters or amides.

The process according to the invention is especially valuable in the preparation of the diethylaminoethyl ester of penicillin which is known to have valuable therapeutic properties, particularly in the treatment of diseased lung tissue.

The invention therefore specifically includes a process for the production of the diethylaminoethyl ester of penicillin in which compounds of the general Formula II above are reacted with diethylaminoethanol in the presence of an inert solvent.

It is to be noted however that in the conversion of penicillin to an ester or amide thereof according to the invention it is not necessary to isolate the intermediate compound and that the desired compounds can be obtained by reacting the salt of penicillin in a solvent with the chloroformic ester and thereafter adding, in the case of esters, the hydroxylic compound under basic conditions, or in the case of amides the primary or secondary amine.

Any convenient salt of penicillin may be used in the process according to the invention, either an organic base salt or a metal salt. Some salts, for example, primary amine salts are not of course suitable since their basic portions may react with the anhydride; it should be remembered that there are a number of metals and organic bases which either destroy penicillin or do not form salts with it. We prefer to use penicillin salts of tertiary amines, for example triethylamine and N-ethylpiperidine but other examples of suitable salts are the sodium or potassium salts.

The solvents used in the formation of the new compounds of general Formula II must of course be inert to the reactants. Where salts of penicillin derived from organic bases are used we prefer to use such solvents as chloroform, ethyl acetate, acetone or ether, and where metallic salts are used we prefer that the solvent should be a water-miscible one such as acetone, dioxan or tetrahydrofuran, with or without the addition of water. It is preferable that such aqueous solvents should contain not more than about 30% of water. Such solvents are also suitable for the second stage and the solvent employed in the first and second stages can of course be the same.

Both of the herein described processes are preferably carried out at low temperatures within the range of from —20° C. to +60° C., and a convenient and suitable temperature is approximately 0° C.

As stated above, when forming the esters according to the invention the hydroxylic compound is added "under basic conditions"; it is to be understood that such basic conditions are provided either by the presence of a tertiary amine or by the use of a hydroxylic compound which itself contains a tertiary amino group.

Examples of suitable tertiary amines used to create the basic conditions are pyridine, dimethyl aniline or triethylamine.

Normally it will not be necessary to isolate the compound of general Formula II above in the preparation of esters and amides as herein described, but such isolation may if desired be effected, for example as described hereafter in Example 10.

The esters and amides prepared according to the invention may for example be isolated from the reaction mixture in one of three ways, according to the type of ester or amide formed, that is to say:

(1) *Neutral esters and amides.*—A solution in the non-aqueous solvent or a chloroform extract of the aqueous solution is washed with a citrate buffer solution (pH 2.0) to remove the excess base, and with a phosphate buffer solution (pH 8.0) to remove any unchanged penicillin, the solution is dried and the solvent is removed therefrom by distillation.

(2) *Basic esters and amides.*—The solution of the reactants in a water-immiscible organic solvent is washed with a phosphate buffer solution (pH 8.0), and dried, the solvent removed therefrom by distillation and the residue is taken up in acetone or other suitable solvent from which the basic amide or ester is precipitated as a hydrogen halide.

(3) *Acidic esters and amides.*—The solution of the reactants in an organic water-immiscible solvent is extracted with a solution of sodium bicarbonate. The aqueous phase is made acid, extracted with a suitable organic solvent, the organic extract dried and the solvent removed by distillation.

For the better understanding of the invention the following examples are given only as illustrations.

EXAMPLE 1

Methylbenzylpenicillinate (a) Benzylpenicillin triethylammonium salt (1.9 g.) in alcohol-free chloroform (10 cc.) was stirred at 0° with a solution of ethylchloroformate (0.475 g.) in chloroform (5 cc.) for 10 minutes. To the clear, colourless solution was added methanol (10 cc.) containing a few drops of pyridine. A slow evolution of carbon dioxide was observed. After standing at 0° for one hour the reaction mixture was poured into a large volume of water and extracted with chloroform. The chloroform extract was washed with a citrate buffer at pH 2, followed by two washings with a phosphate buffer at pH 7.8. After drying the chloroform was removed by distillation under reduced pressure affording a white solid (0.81 g.). Recrystallisation from carbon tetrachloride gave the pure methyl ester (0.51 g.), M. P. 96.5–97.5°, $[\alpha]_D^{22}$ +172 (c.=1 in $CHCl_3$), (see Penicillin Monograph, Princeton, 1945, page 94).

(b) Sodium benzylpenicillinate (3.56 g.) in aqueous acetone (25 cc. of 90% acetone) was stirred at 0° with a solution of ethylchloroformate (1.085 g.) in acetone (5 cc.) for 10 minutes. The precipitated sodium chloride was removed by filtration. To the clear filtrate was added methanol (10 cc.) containing a few drops of pyridine, the reaction mixture was allowed to stand at 0° for one hour before being poured into a large volume of water. Organic material was extracted with chloroform, the extract was washed once with buffer at pH 2 and twice at pH 7.8. After drying the solvent was removed under reduced pressure, the white solid residue was recrystallised from carbon tetrachloride/petroleum ether to yield the pure methyl ester (2.12 g.; 66%), M. P. 96.5–97.5°, $[\alpha]_D^{22}$=172° (in $CHCl_3$).

EXAMPLE 2

Phenyl benzylpenicillinate

Benzylpenicillin triethylammonium salt (4.35 g.) in alcohol-free chloroform (10 cc.) was stirred at 0° with a solution of ethyl chloroformate (1.085 g.) in chloroform (10 cc.) for 10 minutes. Phenol (0.94 g.) in chloroform (10 cc.) containing a few drops of pyridine was added and the reaction mixture allowed to stand at 0° overnight. The chloroform solution was washed at pH 2 and twice at pH 7.8. After drying the solvent was removed by distillation under reduced pressure, the residue was dissolved in ether (20 cc.) and allowed to stand at 0° for a few hours. The white crystals which had formed were collected and recrystallised from ethylacetate/ether, the phenyl ester was obtained as white needles (1.09 g. 27%), M. P. 154–155°, $[\alpha]_D^{22}$ +151° (c.=1 in $CHCl_3$). (Found: C, 64.5; H, 5.5; N, 7.05. $C_{22}H_{22}O_4N_2S$ requires C, 64.35; H, 3.4; N, 6.85%.)

EXAMPLE 3

2-diethylaminoethyl benzylpenicillinate (a) Potassium benbylpenicillinate (3.73 g.) in aqueous acetone (25 cc. of 90% acetone) at 0° was treated with ethylchloroformate (1.085 g.) in acetone (5 cc.) for 10 minutes. Diethylaminoethanol (1.13 g.) in acetone (5 cc.) was added and the reaction mixture allowed to stand at 0° for 30 minutes. After pouring into a large volume of cold water the organic material was extracted with chloroform. The solvent was removed in vacuo leaving a brown gum (1.87 g.). The gum was dissolved in acetone (1.0 cc.) and the solution then added, with vigorous stirring, to an ice cold solution of glacial acetic acid (0.4 cc.) in water (6.5 cc.). The aqueous solution was extracted with a little ethyl acetate, then cooled to 0° and a solution of sodium iodide (1 g.) in water (5 cc.) added slowly. The white solid which was precipitated was filtered off and dried. The yield of ester hydriiodide was 2.31 g.m.p. 177–178°. (Found: I, 22.55. $C_{22}H_{32}O_4N_3SI$ requires I, 22.6%.)

(b) Benzylpenicillin triethylammonium salt (8.7 g.) in chloroform (22 cc.) was treated with ethylchloroformate (2.17 g.) in chloroform (10 cc.) at 0° for 10 minutes. To the clear solution was added diethylaminoethanol (2.34 g.) in chloroform (10 cc.), and the solution was allowed to stand at 0° C. for 40 minutes. After washing the chloroform solution with water, the solvent was removed and the residue (7.48 g.) dissolved in acetone (2 cc.). The acetone solution, cooled to 0°, was added slowly to a well stirred solution of glacial acetic acid (1.6 cc.), water (20 cc.) and ice (7 g.). The aqueous solution was filtered from a little gummy solid which was formed, and then a solution of sodium iodide (4 g.) in water (20 cc.) was slowly added to the ice cold solution. The precipitated ester hydriiodide was collected as a creamy solid (8.23 g.), M.P. 173–177°.

EXAMPLE 4

Benzylpenicillin cyclohexylamide (a) Benzylpenicillin triethylammonium salt (4.35 g.) in alcohol free chloroform (10 cc.) was stirred at 0° with ethylchloroformate (1.085 g.) in chloroform (10 cc.) for 10 minutes. Cyclohexylamine (0.99 g.) in chloroform (10 cc.) was added to the clear solution and vigorous evolution of carbon dioxide observed. After standing at 0° for 30 minutes the chloroform solution was washed with buffers at pH 2 and pH 7.8, after drying, the solvent was removed under reduced pressure affording a pale fawn solid (4.1 g.). Crystallisation from ethyl acetate gave the cyclohexylamide of benzylpenicillin as white plates (3.42 g.; 84%), M.P. 197.5–199°, $[\alpha]_D^{22}$ +246 (c.=1 in $CHCl_3$). (Found: C, 63.8; H, 7.0; N, 9.85. $C_{22}H_{29}O_3N_3S$ requires C, 63.6: H, 7.05; N, 10.1%.)

(b) Sodium benzylpenicillinate (3.566 g.) in aqueous acetate (25 cc. of 90% acetone) was stirred at 0° with a solution of ethylchloroformate (1.085 g.) in acetone (5 cc.) for 10 minutes. The precipitated sodium chloride was removed by filtration and to the clear filtrate was added cyclohexylamine (0.99 g.) After standing at room temperature for 30 minutes the reaction mixture was poured into a buffer at pH 2 and the organic material was extracted with chloroform. The chloroform extract was washed twice with a buffer at pH 7.8, dried, and the solvent removed in vacuo. The residual solid (2.1 g.) was recrystallised from ethylacetate affording the cyclo hexylamide as white plates (1.75 g.; 42%), M.P. 196–197°, $[\alpha]_D^{21}$ +248 (c.=1 in $CHCl_3$).

EXAMPLE 5

Benzylpenicillin 2:2 dimethylcyclohexylamide

Prepared as for benzylpenicillin cyclohexylamide in Example 4(a) above. From benzylpenicillin triethylammonium salt (4.35 g.), ethylchloroformate (1.085 g.), and 2:2-dimethylcyclohexylamine (1.27 g.). Isolated as white cubes (2.97 g.; 65%), M.P. 218–220° (d), $[\alpha]_D^{22}$ +213 (c.=1 in $CHCl_3$). (Found: C, 65.0; H, 7.6; N, 9.2. $C_{24}H_{33}O_3N_3S$ requires C, 64.95; H, 7.5; N, 9.45%.)

EXAMPLE 6

Benzylpenicillin p-toluidide

Prepared as for benzylpenicillin cyclo hexylamide in Example 4(a) above. From benzylpenicillin triethylammonium salt (4.35 g.), ethylchloroformate (1.085 g.), and p-toluidine (1.07 g.). Isolated as white needles (3.65 g.; 86%). M.P. 192–193°, $[\alpha]_D^{22}$ +286 (c.=1 in $CHCl_3$). (Found: C, 65.8, H, 6.3, N, 9.95. $C_{23}H_{25}O_3N_3S_2$ requires C, 65.25; H, 5.95; N, 9.9%.)

EXAMPLE 7

Benzylpenicillin morphalide

Prepared as for benzylpenicillin cyclohexylamide in Example 4(a) above. From benzylpenicillin triethylammonium salt (4.35 g.), ethylchloroformate (1.085 g.), and morpholine (0.87 g.). Isolated as white needles (3.12 g.; 78%), M.P. 176.5–178°, $[\alpha]_D^{22}$ +89 (c.=1 in $CHCl_3$). (Found: C, 59.6; H, 6.15; N, 10.9. $C_{20}H_{25}O_4N_3S$ requires C, 59.55; H, 6.25; N, 10.4%.)

EXAMPLE 8

Benzylpenicillin-diethylaminoethylamide

Prepared as for benzylpenicillin cyclohexylamide in Example 4(a) above, except that washing with acid buffer at pH 2 was omitted. From benzylpenicillin triethylammonium salt (4.35 g.), ethylchloroformate (1.085 g.), and N.N-diethylethylenediamine (1.16 g.). Isolated as white cubes (3.72 g.; 82%), M.P. 143.5–145°, $[\alpha]_D^{22}$ +227 (c.=1 in $CHCl_3$). (Found: C, 61.0; H, 7.4; N, 12.9. $C_{22}H_{32}O_3N_4S$ requires C, 61.1; H, 7.45; N, 12.95%.)

EXAMPLE 9

Benzylpenicillin ethanolamide

Prepared as for benzylpenicillin cyclohexylamide, Example 4(a). From benzylpenicillin triethylammonium salt (4.35 g.) ethylchloroformate (1.085 g.) and ethanolamine (0.61 g.). Isolated as white feathery rosettes (3.24 g.; 86%) from ethyl acetate, M.P. 129–131°, $[\alpha]_D^{22}$ +256 (c.=1 in $CHCl_3$). (Found: C, 57.1; H, 6.4; N, 10.95. $C_{18}H_{23}O_4N_3S$ requires C, 57.3; H, 6.15; N, 11.15%.)

EXAMPLE 10

Benzylpenicillin carbethoxyanhydride

Benzylpenicillin triethylammonium salt (4.35 g.) in dry chloroform (20 cc.) at 0° was stirred with ethyl chloroformate (1.085 g.) in (10 cc.) for 10 minutes. The chloroform solution was washed twice with ice cold water, dried ($MgSO_4$), and the solvent removed in vacuo at 0°. The last traces of chloroform were removed below 25° at a pressure of 10–4 mm. The benzylpenicillin carbethoxyanhydride was isolated as a colourless gum (1.95 g.), $[\alpha]_D^{22}$ +159 (c.=1 in $CHCl_3$). (Found: C, 55.9; H, 5.65; N, 6.95. $C_{19}H_{22}O_6N_2S$ requires C, 56.15; H, 5.54; N, 6.9%.)

EXAMPLE 11

Benzylpenicillin p-amidobenzoic acid

Benzylpenicillin triethylammonium salt (4.35 g.) in dry acetone (20 cc.) was stirred at 0° with ethyl chloroformate (1.085 g.) in acetone (10 cc.) for 20 minutes, the white needles which separated being removed by filtration, to the filtrate was added p-aminobenzoic acid (1.37 g.) and the reaction mixture was stirred at room temperature overnight. After pouring into a large volume of water the organic material was extracted with ethyl acetate, and acidic material was extracted from the ethyl acetate with sodium hydrogen carbonate solution. The aqueous layer was separated, acidified, and the organic material extracted into chloroform. After drying, the volume of the chloroform solution was reduced by distillation, ether and petrol ether were added, and the solution was allowed to stand overnight. The solid which had formed was collected and recrystallised from ethyl acetate/petrol, affording the benzylpenicillin p-amidobenzoic acid as a white solid (3.2 g.), M.P. 130–138° (d), $[\alpha]_D^{22}$ +301 (c.=1 in ethyl acetate). (Holysz and Stavely, loc. cit. give M.P. 130–135° (d), $[\alpha]_D^{26}$ +295 in ethyl acetate.)

EXAMPLE 12

Benzylpenicillin carbobenzyloxy anhydride

Benzylpenicillin triethylamine salt (4.35 g.) dissolved in "Analar" chloroform (25 mls.) was stirred in an ice-water bath during the addition of a solution of benzyl chloroformate in toluene (42% w./v.; 2.47 mls.). After ten minutes the solution was washed rapidly with two portions of ice-cold water, dried over sodium sulphate and evaporated to dryness under reduced pressure, affording a pale yellow stiff gum (2.80 g.) which could not be crystallised or purified further. $[\alpha]_D^{20}$=+146° (1% in chloroform). (Found: N, 6.81%. $C_{24}H_{24}O_6N_2S$ requires N, 5.98%.)

To a solution of the anhydride prepared as above was added a solution of furfuryl alcohol (0.98 g.) in "Analar" chloroform (10 mls.). The solution was allowed to stand at room temperature for 1½ hours after the addition of triethylamine (4 drops) and then washed with citric acid solution (0.1 M), sodium monohydrogen phosphate solution (0.2 M) and water, and dried over sodium sulphate. Removal of the solvent under reduced pressure afforded a yellow oil (2.86 g.) which on dissolving in carbon tetrachloride slowly deposited crystals of furfuryl benzylpenicillinate (0.63 g.), M.P. 121–4°.

Two recrystallisations from carbon tetrachloride raised the melting point to 130.5–133.5°. (Found: N, 6.8. $C_{21}H_{22}O_5N_2S$ requires N, 6.8%.)

EXAMPLE 13

Benzylpenicillin cyclohexylamide

To a solution of the anhydride prepared as in Example 12 was added a solution of cyclohexylamine (0.99 g.) in "Analar" chloroform (10 mls.). After standing for ½ hour at room temperature the solution was washed, dried and evaporated as above affording a yellow semisolid (3.09 g.). One crystallisation from ethyl acetate yielded benzylpenicillin cyclo-hexylamide as white plates (0.86 g.), M.P. 191–3°, undepressed on admixture with an authentic specimen.

EXAMPLE 14

Benzylpenicillin carboisobutyloxy anhydride

Benzylpenicillin triethylamine salt (4.35 g.) dissolved in "Analar" chloroform (15 mls.) was stirred in an ice-water bath during the addition of a solution of isobutyl chloroformate in toluene (11.4%; 11.9 mls.). After ten minutes the solution was washed rapidly with two portions of ice-cold water, dried over sodium sulphate and evaporated to dryness under reduced pressure affording a pale yellow gum (2.60 g.) which could not be crystallised or purified further, $[\alpha]_D^{20} = +140°$ (1% in CHCl$_3$). (Found: N, 6.46%. $C_{21}H_{26}O_6N_2S$ requires N, 6.45%.)

To a solution of the anhydride prepared as above was added a solution of furfuryl alcohol (0.98 g.) in "Analar" chloroform (10 mls.). Triethylamine (4 drops) was added and the solution refluxed for ½ hour before working up as in Example 12, affording a yellow gum (4.11 g.). The gum dissolved in ethyl acetate was passed through a column of alumina (100 g.) weakened by the addition of dilute acetic acid (10%; 5 mls.). Evaporation under reduced pressure of the eluate afforded a yellow oil (1.88 g.) which, on crystallisation and recrystallisation from carbon tetrachloride, yielded benzylpenicillin furfuryl ester (0.31 g.), M.P. 129.5–131.5°, undepressed on admixture with an authentic specimen.

EXAMPLE 15

*Benzylpenicillin cyclohexylamide*

To an ice-cold solution of the anhydride prepared as in Example 14 was added a solution of cyclohexylamine (0.99 g.) in "Analar" chloroform (10 mls.). After ¾ hour at ice-bath temperature the solution was washed, dried and evaporated as for Example 12 affording a white solid (3.90 g.), M.P. 170–8°, which crystallised from ethyl acetate as white plates (2.26 g.), M.P. 196–7°, undepressed on admixture with an authentic specimen of benzylpenicillin cyclohexylamide.

EXAMPLE 16

*Benzylpenicillin carboisopropyloxy anhydride*

Benzylpenicillin triethylamine salt (8.7 g.) dissolved in "Analar" chloroform (30 mls.) was stirred in an ice-water bath during the addition of a solution of isopropyl chloroformate in toluene (6.4%; 38.2 mls.). After 30 minutes the mixture was diluted to 200 mls. with "Analar" chloroform and divided into two portions. One portion was washed rapidly twice with ice-cold water, dried over sodium sulphate and evaporated to dryness under reduced pressure affording an almost colourless glass (2.74 g.) which could not be crystallised, $[\alpha]_D^{20} +151°$ (1% in CHCl$_3$). (Found: N, 6.9%. $C_{20}H_{24}O_6N_2S$ requires N, 6.7%.)

To the other portion of anhydride solution was added a solution of cyclohexylamine (0.99 g.) in "Analar" chloroform (10 mls.). After 1½ hours at room temperature the solution was washed, dried and evaporated as for Example 12 affording a white solid (3.00 g.), M.P. 159–166°, which crystallised from ethyl acetate as white plates (1.63 g.), M.P. 191–3°, undepressed on admixture with an authentic specimen of benzylpenicillin cyclohexylamide.

EXAMPLE 17

*Benzylpenicillin carbomethoxy anhydride*

Benzylpenicillin triethylamine salt (2.17 g.) dissolved in "Analar" chloroform (10 mls.) was stirred at room temperature during the addition of methyl chloroformate (0.4 ml.). After ten minutes the solution was washed twice with cold water, dried over magnesium sulphate and evaporated in vacuo. An almost colourless gum (1.8 g.) was obtained which could not be crystallised, $[\alpha]_D^{20} +151.8$ (c.=1 in CHCl$_3$). (Found: C, 53.2%; H, 5.5%; N, 7.21%. $C_{18}H_{20}O_6N_2S$ requires C, 55.1%; H, 5.1%; N, 7.15%.)

EXAMPLE 18

*Furfuryl benzylpenicillinate*

A suspension of benzylpenicillin triethylamine salt (2.17 g.) in ether (10 mls.) was stirred while ethyl chloroformate (0.5 ml.) was added followed by pyridine (2 drops). After 10 minutes furfuryl alcohol (0.43 ml.) was added and the mixture refluxed for 30 minutes. It was cooled, filtered and the filtrate washed with water, dilute hydrochloric acid (0.02 N), sodium bicarbonate solution, water and finally dried over magnesium sulphate. At this stage the ester crystallised out so chloroform (20 ml.) was added and the solution filtered free from magnesium sulphate. Evaporation of the solvent in vacuo yielded a gum (0.95 g.) which crystallised slowly from carbon tetrachloride as white needles (0.25 g.), M. P. 119–124°.

One recrystallisation from carbon tetrachloride raised the melting point to 127–129°, $[\alpha]_D^{20} +163°$ (c.=1 in CHCl$_3$).

EXAMPLE 19

*Benzylpenicillin cyclohexylamide*

A suspension of benzylpenicillin triethylamine salt (2.17 g.) in dioxan (10 mls.) was stirred while ethyl chloroformate (0.5 ml.) followed by pyridine (2 drops) was added. After 10 minutes, cyclohexylamine (0.61 ml.) was added and the mixture allowed to stand at room temperature for 30 minutes. It was then filtered and most of the dioxan removed from the filtrate in vacuo. An excess of water was added and the mixture extracted with chloroform which was then washed and dried as in Example 18. Evaporation of the solvent in vacuo yielded a gummy solid (3 g.) which crystallised from ethyl acetate as white plates (1 g.), M. P. 193–195°. $[\alpha]_D^{20} +246$ (c.=1 in CHCl$_3$).

EXAMPLE 20

*Benzylpenicillin cyclohexylamide*

A suspension of benzylpenicillin triethylamine salt (2.17 g.) in tetrahydrofuran (10 ml.) was stirred while ethyl chloroformate (0.5 ml.) followed by pyridine (2 drops) was added. After 10 minutes cyclohexylamine (0.61 ml.) was added and the mixture allowed to stand at room temperature for 30 minutes. It was then worked up as in Example 19, yielding a gummy white solid (2.9 g.) which crystallised from ethyl acetate as white plates (0.95 g.), M. P. 195–196°, $[\alpha]_D^{20} +246.5$ (c.=1 in CHCl$_3$).

EXAMPLE 21

*Benzylpenicillin cyclohexylamide*

Methyl chloroformate (0.5 ml.) was added to a stirred suspension of benzylpenicillin triethylamine salt (2.17 g.) and pyridine (3 drops) in ethyl acetate (20 cc.). Cyclohexylamine (0.61 ml.) was added and the mixture allowed to stand for 30 minutes. The product was isolated as in the previous example, wt. 1.5 g., M. P. 195–197°, $[\alpha]_D +247°$ (c.=1 in CHCl$_3$).

EXAMPLE 22

*3-morpholinoprop-2-yl benzyl penicillinate*

Sodium benzylpenicillin (7.12 g.) in dry acetone (50 cc.) containing 2 drops of pyridine was stirred at 0° C. with ethyl chloroformate (217 g.). After ten minutes the precipitated sodium chloride was removed by filtration through a pad of kieselguhr. The filtrate was concentrated in vacuo to ca. 25 cc. and 3-morpholinopropan-2-ol (3.9 g.) added at 0°. The remaining solvent was removed in vacuo the residual oil dissolved in a little acetone and the penicillin ester precipitated by addition of light petroleum. The supernatant liquor was decanted off, the ester dissolved in ether (100 cc.) and filtered from any solid material.

The hydriodide was precipitated by dropwise addition of an 0.2 N ethereal solution of hydrogen iodide (80 cc.) to a well stirred ethereal solution of the ester held at 0° in an ice bath. The solid was removed by filtration and dried in vacuo. The hydriodide was a pale yellow amorphous powder (6 g.), decomposing on heating. $[\alpha]_D^{22} = 87°$ (c.=1.0 in $CHCl_3$). (Found: N, 6.5; I, 21.3. $C_{23}H_{32}O_5N_3SI$ requires N, 7.1; I, 21.5%.)

The compound had a potency of 800 units/mg.

EXAMPLE 23

N-Ethyldiethanolamine bis-benzylpenicillinate

Benzylpenicillin triethylammonium salt (8.7 g.) in chloroform (30 cc.) containing pyridine (3 drops) was treated at 0° with ethylchloroformate (2.17 g.) in chloroform (20 cc.). After stirring the solution for ten minutes, N-ethyldiethanolamine (1.33 g.) was added and the reaction mixture allowed to stand at 0° for 3 days. The chloroform solution was washed with water, buffer at pH 7.8, and water. The chloroform extract was dried over $MgSO_4$ and the solvent removed in vacuo affording a yellow gum (7.12 g.) which assayed 1070 i.u./mg.

The hydrochloride was prepared by dissolving the ester base in iso propanol (100 cc.) and adding iso propanolic hydrogen chloride (10 cc. of 1.0 N), on addition of a large volume of ether gummy material separated. Repeated trituration of this material afforded a pale buff coloured solid (4.1 g.) $[\alpha]_D^{21}$ +144° (c.=1 in $CHCl_3$). (Found: Cl, 4.3. $C_{38}H_{48}O_8N_5S_2Cl$ required Cl, 4.35%.) The solid assayed 1200 i.u./mg.

A further sample of the ester base (2.5 g.) in a mixture of iso propanol and ether (1:1; 20 cc.) on treatment with ethereal hydrogen iodide (a slight excess) yielded the hydriodide as a yellow amorphous powder (1.85 g.), $[\alpha]_D^{24}$ +140° (c.=1 in $CHCl_3$). (Found: I; 14.5%. $C_{38}H_{48}O_8N_5S_2I$ requires I, 14.2%.) The solid assayed 1270 i.u./mg.

We claim:
1. As new compounds, compounds of the general formula

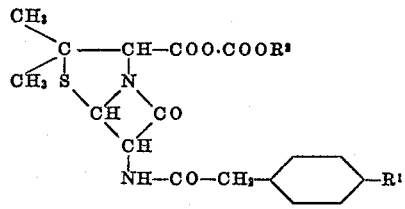

where $R^1$ is a member of the class consisting of hydrogen and hydroxyl and where $R^2$ is a member of the class consisting of lower alkyl and monocyclic aralkyl.

2. As new compounds, compounds as claimed in claim 1 in which $R^1$ is hydrogen and $R^2$ is an alkyl group having not more than four carbon atoms.

3. The compounds of claim 1 in which $R^1$ is hydroxyl and $R^2$ is an alkyl group of not more than four carbon atoms.

4. As new compounds, compounds as claimed in claim 1 in which $R^1$ is hydrogen and $R^2$ is a benzyl group.

5. A mixed anhydride of benzyl penicillin and the monoethyl ester of carbonic acid.

No references cited.